(12) United States Patent
Zhang

(10) Patent No.: US 12,278,942 B2
(45) Date of Patent: Apr. 15, 2025

(54) CALIBRATION METHOD AND APPARATUS FOR BINOCULAR CAMERA, IMAGE CORRECTION METHOD AND APPARATUS FOR BINOCULAR CAMERA, STORAGE MEDIUM, TERMINAL AND INTELLIGENT DEVICE

(71) Applicant: SPREADTRUM COMMUNICATIONS (SHANGHAI) CO., LTD., Shanghai (CN)

(72) Inventor: Huimin Zhang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 127 days.

(21) Appl. No.: 18/021,982

(22) PCT Filed: Aug. 19, 2021

(86) PCT No.: PCT/CN2021/113462
§ 371 (c)(1),
(2) Date: Feb. 17, 2023

(87) PCT Pub. No.: WO2022/037633
PCT Pub. Date: Feb. 24, 2022

(65) Prior Publication Data
US 2023/0370577 A1 Nov. 16, 2023

(30) Foreign Application Priority Data
Aug. 19, 2020 (CN) .......................... 202010838111.5

(51) Int. Cl.
H04N 13/246 (2018.01)
G06T 7/50 (2017.01)
(Continued)

(52) U.S. Cl.
CPC ............ *H04N 13/246* (2018.05); *G06T 7/50* (2017.01); *G06T 7/85* (2017.01); *H04N 13/239* (2018.05);
(Continued)

(58) Field of Classification Search
CPC .. H04N 13/246; H04N 13/239; H04N 13/296; H04N 2013/0081; G06T 7/50;
(Continued)

(56) References Cited

U.S. PATENT DOCUMENTS

| | | |
|---|---|---|
| 2013/0002826 A1 | 1/2013 | Ishiyama et al. |
| 2013/0038700 A1* | 2/2013 | Horita ...................... G02B 7/36 348/E13.005 |

(Continued)

FOREIGN PATENT DOCUMENTS

| | | |
|---|---|---|
| CN | 103559708 A | 2/2014 |
| CN | 106131408 A | 11/2016 |

(Continued)

OTHER PUBLICATIONS

International Search Report for International Application No. PCT/CN2021/113462; Mailing Date, Oct. 26, 2021.

*Primary Examiner* — Susan E. Hodges
(74) *Attorney, Agent, or Firm* — CANTOR COLBURN LLP (57) ABSTRACT

A method and device for calibrating a binocular camera and an image rectification method and device for a binocular camera, a storage medium, a terminal and an intelligent device are provided. A first focus group is acquired, which includes multiple focal lengths for calibrating, and each focal length represents a focal length of a main camera in the binocular camera, calibration operations are performed on the binocular camera based on the first focal length group, where the focal length of the main camera for shooting a (Continued)

calibration target plate is adjusted during each calibration operation, the adjusted focal length is determined based on the first focal length group, and a relative position between the binocular camera and the calibration target plate remains unchanged during the calibration operations, and a relationship between calibration parameters and the focal lengths is determined based on the calibration operations.

16 Claims, 3 Drawing Sheets

(51) Int. Cl.
    *G06T 7/80*     (2017.01)
    *H04N 13/239*     (2018.01)
    *H04N 13/296*     (2018.01)

(52) U.S. Cl.
    CPC . *H04N 13/296* (2018.05); *G06T 2207/10148* (2013.01)

(58) Field of Classification Search
    CPC ... G06T 7/85; G06T 2207/10148; G06T 7/80; G06T 5/80
    USPC .................................................. 348/47, 7
    See application file for complete search history.

(56) References Cited

U.S. PATENT DOCUMENTS

| | | | |
|---|---|---|---|
| 2015/0213589 A1* | 7/2015 | Chou | G06T 7/85 |
| | | | 348/47 |
| 2016/0316155 A1* | 10/2016 | Richards | H04N 23/957 |
| 2017/0109889 A1 | 4/2017 | Yun et al. | |
| 2022/0270294 A1* | 8/2022 | Bao | G06T 7/13 |

FOREIGN PATENT DOCUMENTS

| | | |
|---|---|---|
| CN | 109859272 A | 6/2019 |
| CN | 110197510 A | 9/2019 |
| CN | 111080705 A | 4/2020 |
| CN | 111932636 A | 11/2020 |
| IN | 110675458 A | 1/2020 |

\* cited by examiner

CALIBRATION METHOD AND APPARATUS FOR BINOCULAR CAMERA, IMAGE CORRECTION METHOD AND APPARATUS FOR BINOCULAR CAMERA, STORAGE MEDIUM, TERMINAL AND INTELLIGENT DEVICE

CROSS REFERENCE TO RELATED APPLICATIONS

This is the U.S. national stage of application No. PCT/CN2021/113462, filed on Aug. 19, 2021. Priority under 35 U.S.C. § 119(a) and 35 U.S.C. § 365(b) is claimed from Chinese Application No. 202010838111.5, filed Aug. 19, 2020, the disclosure of which is also incorporated herein by reference.

TECHNICAL FIELD

The present disclosure relates to the technical field of binocular cameras, and in particular to a method and device for calibrating a binocular camera and an image rectification method and device for a binocular camera, a storage medium, a terminal, and an intelligent device.

BACKGROUND

A binocular camera system may simulate the function of human eyes. Specifically, the binocular camera system estimates a depth of a shot object in the physical world by using two cameras to in a triangulation manner, to obtain a depth map of a shot scene.

The binocular stereo vision technology may be roughly divided into two parts. The first part is to acquire parameters of a binocular camera imaging model, where the process of acquiring the parameters of the binocular camera imaging model is called camera calibration, and the acquired parameters may be called calibration parameters. The second part is to rectify a binocular image in an actual shooting process based on the calibration parameters acquired in the first part, such as eliminating the row alignment error and parallax error and calculate the depth information of the binocular image according to the principle of stereo matching.

In practice, the binocular camera system usually includes an Auto Focus (AF) camera and a Fixed Focus (FF) camera. Therefore, to acquire the parameters of the binocular camera imaging model, it is actually required to acquire the internal parameter matrix and relative position relationship (i.e., an external parameter matrix) of the AF camera (which may be called a main camera) and the FF camera (which may be called a sub camera).

At present, there are many schemes to provide algorithms for calibrating a binocular camera. With these schemes and the algorithms adopted therein, the internal and external parameter matrices of the main camera and the sub camera may be obtained. However, the above scheme for calibrating a binocular camera has the following defects that the row alignment error and parallax error cannot be effectively eliminated after rectifying an image actually shot by a binocular camera based on such calibration parameter, which greatly affects the accuracy of image rectification.

SUMMARY

A method for calibrating a binocular camera is provided according to an embodiment of the present disclosure, which includes: acquiring a first focus group, where the first focus group includes multiple focal lengths for calibrating, and each of the focal lengths represents a focal length of a main camera in the binocular camera; performing calibration operations on the binocular camera based on the first focal length group, where the focal length of the main camera in the binocular camera for shooting a calibration target plate is adjusted during each of the calibration operations, the adjusted focal length is determined based on the first focal length group, and a relative position between the binocular camera and the calibration target plate remains unchanged during the calibration operations; and determining a relationship between calibration parameters and the focal lengths based on the multiple calibration operations.

An image rectification method for a binocular camera is further provided according to an embodiment of the present disclosure, which includes: acquiring an image shot by the binocular camera and a real-time focal length of a main camera in the binocular camera for shooting the image; acquiring a calibration parameter corresponding to the real-time focal length based on the relationship between calibration parameters and the focal lengths determined by using the above method for calibrating a binocular camera; and rectifying the image based on the acquired calibration parameter.

A storage medium is further provided according to an embodiment of the present disclosure, on which a computer program is stored, the computer program, when executed by a processor, performs the above described methods.

A terminal is further provided according to an embodiment of the present disclosure, which includes a processor and a memory, where the memory stores a computer program capable of running on the processor, and the processor, when running the computer program, performs steps of the above method.

An intelligent device is further provided according to an embodiment of the present disclosure, which includes a memory and a processor, where the memory stores a computer program capable of running on the processor, and the processor, when running the computer program, performs steps of the above image rectification method.

DETAILED DESCRIPTION OF EMBODIMENTS

As described in the background section, the schemes for calibrating a binocular camera have the following defects that the row alignment error and parallax error cannot be effectively eliminated after rectifying an image actually shot by a binocular camera based on a calibration parameter, which greatly affects the accuracy of image rectification.

Specifically, taking a binocular camera system integrated in a smart phone as an example, the binocular camera system simulates a binocular structure of a human by using a stereo vision technology, and acquires depth information of a shot object by collecting images shot by two cameras and calculating a parallax between the images.

In the stereo vision technology, an external parameter matrix, an internal parameter matrix, a distortion parameter, and the like of the left and right cameras (i.e., the main camera and the sub camera) are acquired by using a camera calibration technology, which are calibration parameters of the binocular camera. The external parameter matrix includes a rotation vector and a translation vector between a world coordinate system and a camera coordinate system, and the internal parameter matrix includes a focal length, a center point translation and other parameters. The above parameters may be collectively referred to as calibration parameters. Therefore, the process for calibrating a binocular camera is referred to as a process of acquiring the calibration parameters.

Then, in actual shooting, the calibration parameters acquired by performing the calibration operations are used to rectify images outputted by the main and sub cameras in combination with the polar geometry technology, so as to achieve row alignment.

The binocular camera is calibrated in order to establish a camera imaging geometric model and rectify lens distortion. First, a process of mapping an object from a 3D world to a camera imaging plane is performed. In this process, it is required to consider a transformation relationship between a world coordinate system, a camera coordinate system, an image coordinate system, and a pixel coordinate system. According to the principle of triangle similarity and coordinate conversion of image pixels, points in 3D time may be converted to coordinates in the pixel coordinate system on the imaging plane. This coordinate conversion process may be characterized by a coordinate conversion formula, parameters of which include at least: external parameter matrices R and T, where R represents a rotation matrix of the main camera and the sub camera, and T represents a translation vector between the main camera and the sub camera; a component fx of a focal length f of the main camera in a direction x of the image coordinate system, and a component fy of the focal length f of the main camera in a direction y of the image coordinate system; and an internal parameter matrix M, which is related to the focal length of the main camera, the translation of the center point, and the like.

The inventor of the present disclosure finds, through analysis, that the defect of the scheme for calibrating a binocular camera is that the binocular camera calibrated only once on the target at a fixed distance, and the calibration parameter obtained by this single calibration operation will be applied to images shot by the binocular camera based on any focal length during real time shooting.

However, in the focusing process of the main camera, a Voice Coil Motor (VCM) in the main camera drives a lens to change its position, so as to adjust the focal length. During this process, components of the focal length of the main camera in each axis direction in the image coordinate system will change accordingly. Since both the internal parameter matrix M and the external parameter matrices R and T are directly or indirectly related to the focal length, the change of the focal length of the main camera may affect the internal parameter matrix M, and also affect the external parameter matrices R and T between the main camera and the sub camera.

It can be seen that the internal parameter matrix and external parameter matrix obtained in the above calibration process can only be applied to the physical distance for calibrating.

In actual shooting, a distance between a shot object and a binocular camera may range from 0.3 m to infinity. Therefore, in practice, the VCM in the main camera will change a position of the lens according to an auto focusing algorithm with the change of the distance of the shot object, where the focal length of the main camera will change. The single calibration parameter of a fixed physical distance obviously cannot be used as the parameters of the main/sub imaging model in which the focal length changes due to the change of the physical distance, resulting in that the row alignment error and parallax error cannot be effectively eliminated.

Row alignment error refers to that, for the main/sub rectification image obtained by rectification based on the calibration parameters, theoretically, if the calibration parameters are correct, imaging points of the same scene on main/sub rectification image should be on the same horizontal line, that is, row alignment. However, due to the auto focus movement of the main camera, the calibration parameters will not be applicable to a new scene image, and the imaging points of the same scene on the main/sub rectification image will not be on the same horizontal line.

Parallax error refers to that, for the main/sub rectification image obtained by rectifying based on the calibration parameters, theoretically, if the calibration parameters are correct, parallaxes of a number of scene points with the same depth (far and near) information on the main/sub image should be equal to each other. However, due to the auto focusing movement of the main camera, the calibration parameters will not be applicable to a new scene image, and parallaxes of a number of scene points at the same depth imaged on the main/sub rectification image are different from each other, which is called parallax error.

Therefore, the calibration parameters generated by only taking one shot at the standard distance are obviously not accurate enough in practice, and the row alignment error and parallax error of the shot image cannot be eliminated.

The technical problem solved by the present disclosure is to provide an improved method for calibrating a binocular camera to improve the accuracy of image rectification.

To solve the above technical problem, a method for calibrating a binocular camera is provided according to an embodiment of the present disclosure, which includes: acquiring a first focus group, where the first focus group includes multiple focal lengths for calibrating, and each of the focal lengths represents a focal length of a main camera in the binocular camera; performing calibration operations on the binocular camera based on the first focal length group, where the focal length of the main camera in the binocular camera for shooting a calibration target plate is adjusted during each of the calibration operations, the adjusted focal length is determined based on the first focal length group, and a relative position between the binocular camera and the calibration target plate remains unchanged during the calibration operations; and determining a relationship between calibration parameters and the focal lengths based on the calibration operations.

In this implementation scheme, multiple calibration parameters are acquired by performing multiple calibration operations on the binocular camera, and different calibration parameters correspond to different focal lengths. The relationship between the calibration parameters and the focal lengths may be obtained, which can be used to select the most appropriate calibration parameter based on an actual focal length in actual shooting. In particular, since multiple calibration parameters correspond to different focal lengths, the most appropriate calibration parameter may be selected based on the real-time focal length for shooting to rectify the image shot by the binocular camera, so as to effectively eliminate the row alignment error and parallax error, improving the accuracy of image rectification. Furthermore, during the multiple calibration operations, the calibration parameters at different physical distances are obtained by changing the focal length of the main camera without changing the physical distance between the binocular camera and the calibration target plate. As a result, there is no additional burden during the calibration operations, and the cost of calibration operations is not increased.

Compared with the schemes described in the background section, the technical solution of the embodiment of the present disclosure has the following beneficial effects.

A method for calibrating a binocular camera is provided according to an embodiment of the present disclosure, which includes: acquiring a first focus group, where the first focus group includes multiple focal lengths for calibrating, and each of the focal lengths represents a focal length of a main camera in the binocular camera; performing calibration operations on the binocular camera based on the first focal length group, where the focal length of the main camera in the binocular camera for shooting a calibration target plate is adjusted during each of the calibration operations, the adjusted focal length is determined based on the first focal length group, and a relative position between the binocular camera and the calibration target plate remains unchanged during the calibration operations; and determining a relationship between calibration parameters and the focal lengths based on the calibration operations.

Compared with the technical scheme in which calibration operation is performed only once to obtain a single calibration parameter, in this implementation scheme, multiple calibration parameters are acquired by performing multiple calibration operations on the binocular camera, and different calibration parameters correspond to different focal lengths. The relationship between the calibration parameters and the focal lengths may be obtained, which can be used to select the most appropriate calibration parameter based on an actual focal length in actual shooting. In particular, since multiple calibration parameters correspond to different focal lengths, the most appropriate calibration parameter may be selected based on the real-time focal length for shooting to rectify the image shot by the binocular camera, so as to effectively eliminate the row alignment error and parallax error, improving the accuracy of image rectification. Furthermore, during the multiple calibration operations, the calibration parameters at different physical distances are obtained by changing the focal length of the main camera without changing the physical distance between the binocular camera and the calibration target plate. As a result, there is no additional burden during the calibration operations, and the cost of calibration operations is not increased.

Further, the focal length is characterized by the VCM DAC value, where the VCM DAC value represents a current value of a current flowing through a coil in the voice coil motor during the voice coil motor drives the main camera to move to adjust the focal length. In this implementation scheme, the focal length of the main camera is quantized and characterized by the VCM DAC value, without additional components dedicated to read the focal length. Therefore, in this implementation scheme, the focus length may be adjusted by changing the position of the VCM in the main camera, so that calibration operation can be performed for multiple times at different focal lengths while maintaining the constant physical distance between the binocular camera and the calibration target plate.

Further, an image rectification method for a binocular camera is further provided according to an embodiment of the present disclosure, which includes: acquiring an image shot by the binocular camera and a real-time focal length of a main camera in the binocular camera for shooting the image; acquiring a calibration parameter corresponding to the real-time focal length based on the relationship between calibration parameters and the focal lengths determined by using the above method for calibrating a binocular camera; and rectifying the image based on the acquired calibration parameter.

Therefore, the VCM DAC value is set according to a specific physical distance, and the lens of the main camera is driven to change the focal length based on the VCM DAC value. Further, a calibration parameter corresponding to the focal length is calculated by using a preset calibration algorithm, and multiple calibration parameters obtained by performing multiple calibration operations and the corresponding VCM DAC values are automatically saved. In subsequent shooting, the VCM DAC value of the main camera at that time will be read, and the most appropriate calibration parameter is acquired from the prestored calibration parameters. Then, optimal main/sub rectification image is generated, to avoid the row alignment error and parallax error.

In order to make the above objects, features, and beneficial effects of the present disclosure clearer and easy to understand, the embodiments of the present disclosure are described in detail below in combination with the drawings.

Figure 1:
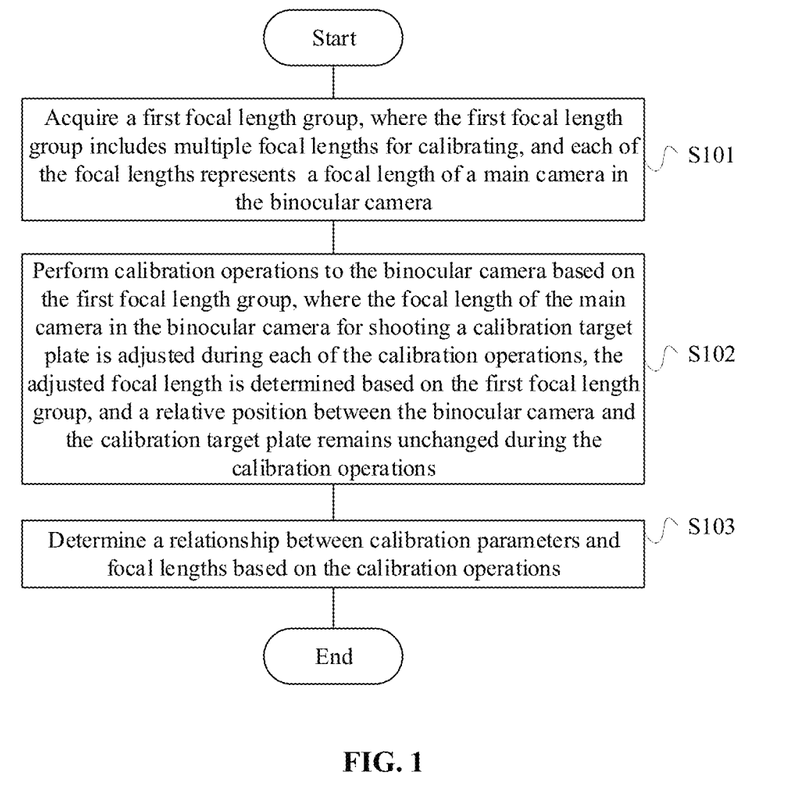
FIG. 1 is a flowchart of a method for calibrating a binocular camera according to an embodiment of the present disclosure.

FIG. 1 is a flowchart of a method for calibrating a binocular camera according to an embodiment of the present disclosure.

This implementation scheme may be applied to a binocular camera system, such as a parameter solving scene of a binocular camera imaging model. The binocular camera system may include a binocular camera and corresponding logic processing modules. The binocular camera may include an AF camera (hereinafter referred to as a main camera) and an FF camera (hereinafter referred to as a sub camera). The two cameras of the binocular camera may also be referred to as a left camera and a right camera according to their positions. The focal length of the main camera is adjustable, and the focal length of the sub camera is fixed.

The binocular camera may also be called a binocular camera module. This implementation scheme may be performed by the manufacturer before the binocular camera system leaves the factory, or by the smartphone manufacturer who intends to integrate the binocular camera system in smartphones. In an embodiment, the main camera and sub camera may be obtained from different camera manufacturers and integrated together by the smartphone manufacturer.

This implementation scheme may be performed by a calibration device, which may include a control module, a shooting module, and a calibration calculation module. The control module is configured to adjust a focal length of a main camera in a binocular camera. The shooting module is configured to control the binocular camera to shoot a calibration image of a calibration target plate based on a focal length indicated by a control module. The calibration calculation module is configured to process the calibration image according to a preset calibration algorithm to obtain a calibration parameter. The calibration device may be a virtual device integrated in a computing device such as a server and a terminal. During the calibration operations described in this embodiment, the computing device is coupled with the binocular camera, so that the calibration device can control the binocular camera and interact with the binocular camera, to achieve multiple calibration operations.

In an embodiment, the method for calibrating a binocular camera in S101 to S103 may be performed by a chip with a calibration function in the calibration device, or by a baseband chip in the calibration device.

Specifically, referring to FIG. 1, the method for calibrating a binocular camera according to the embodiment may include S101 to S103.

In S101, a first focal length group is acquired, where the first focal length group includes multiple focal lengths for calibrating, and each of the focal lengths represents a focal length of a main camera in the binocular camera.

In S102, calibration operations are performed on the binocular camera based on the first focal length group, where the focal length of the main camera in the binocular camera for shooting a calibration target plate is adjusted during each of the calibration operations, the adjusted focal length is determined based on the first focal length group, and a relative position between the binocular camera and the calibration target plate remains unchanged during the calibration operations.

In S103, a relationship between calibration parameters and the focal lengths is determined based on the calibration operations.

In an embodiment, S103 may include acquiring multiple calibration parameters through the calibration operations, and there is a one-to-one correspondence between the multiple calibration parameters and the focal lengths in the first focal length group. Accordingly, based on the one-to-one correspondence between the multiple calibration parameters and the focal lengths in the first focal length group, a relationship between the calibration parameters and the focal lengths may be obtained.

For example, the relationship between the calibration parameters and the focal lengths may be recorded in the form of a table. The table includes two columns, one of which includes the calibration parameters and the other includes the focal lengths. The calibration parameter and focal length in the same row are related to each other.

Data in a mapping lookup table recording the relationship between the calibration parameters and the focal lengths may include the focal lengths in the first focal length group and corresponding calibration parameter obtained through the calibration operations.

Further, the data in the mapping lookup table may also include extended data obtained by performing interpolation on the data obtained through the calibration operations.

In an embodiment, the focal length may be characterized by a VCM Digital To Analog Converter (DAC) value, where the VCM DAC value represents a current value of a current flowing through a coil inside the voice coil motor during the voice coil motor drives the main camera to move to adjust the focal length.

Specifically, VCM represents a voice coil motor in an auto focus camera system. The VCM may drive the lens to move forward or backward by changing a direct current in the coil, so as to change the focus length of the camera. The specific current value of the direct current in the coil during operation of the VCM may be obtained through conversion of the DAC.

Therefore, in this embodiment, the focal length of the main camera is quantized and characterized by the VCM DAC value, without additional components dedicated to read the focal length. In this implementation scheme, the focus length may be adjusted by changing the position of the VCM in the main camera, so that calibration operation can be performed for multiple times at different focal lengths while maintaining the constant physical distance between the binocular camera and the calibration target plate.

Alternatively, the focal length may be obtained by a component externally connected to the binocular camera.

In this embodiment, description is made in detail by taking the VCM DAC value as an example to characterizing the focal length.

In an embodiment, the focal lengths in the first focal length group may correspond to different physical distances, and the physical distance refers to a distance between a binocular camera and an imaging object during actual shooting. Generally, for shooting an imaging object at a corresponding physical distance based on the focal length, the main camera can focus effectively to obtain a clear image.

In this implementation scheme, the calibration parameters corresponding to the focal lengths of different physical distances are obtained during the calibration operations, so that during the actual shooting, an appropriate calibration parameter can be selected according to a real-time focal length of the main camera used in actual shooting for image rectification.

Figure 2:
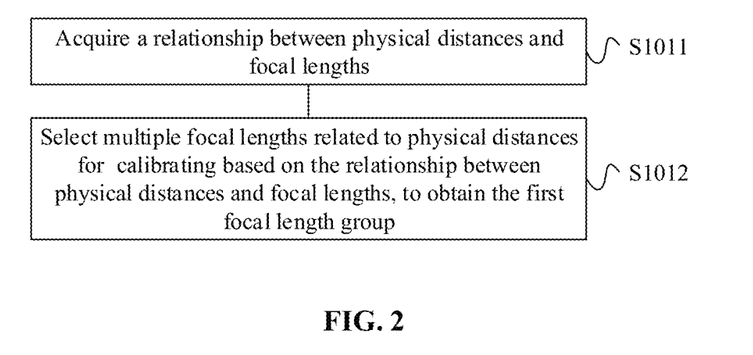
FIG. 2 is a flowchart of S101 in FIG. 1 according to an embodiment.

In an embodiment, referring to FIG. 2, S101 may include S1011 and S1012.

In S1011, a relationship between physical distances and focal lengths is acquired.

In S1012, multiple focal lengths related to physical distances for calibrating are selected according to the relationship between the physical distances and focal lengths to obtain the first focal length group.

Specifically, the relationship between physical distances and focal lengths may be used to obtain the focal lengths in the first focal length group. For example, based on the relationship between physical distances and focal lengths, focal lengths corresponding to key physical distances may be selected to form the first focal length group.

Furthermore, the key physical distance refers to a physical distance for calibrating, such as 53 cm, 60 cm, 70 cm, . . . , 120 cm, 150 cm. The physical distance for calibrating may be determined according to experience.

In an embodiment, S1011 may include acquiring a sample set, where the sample set includes multiple binocular cameras; acquiring a focal length of each of the binocular cameras in the sample set at each of multiple physical distances to obtain a relationship between the physical distances and the focal lengths.

Specifically, the sample set may be selected from the same batch of binocular cameras according to a statistical result of a macro-infinity focus range, where the macro-infinity focus range refers to a difference between a Macro focus and an Infinity (INF) focus of the binocular camera.

Further, the sample set may only include main cameras in multiple binocular cameras.

For example, a batch of main camera modules may be obtained from a module factory, and VCM DAC values at the Macro focus and Infinity focus of each main camera in the batch are acquired.

Further, for each main camera, the macro-infinity focus range of the main camera is obtained according to the VCM DAC values at the Macro focus and Infinity focus of the main camera. For example, the macro-infinity focus range is obtained by using the VCM DAC value at the Macro focus minus the VCM DAC value at the Infinity focus.

Further, according to the statistical result of the macro-infinity focus ranges of the same batch of main cameras, golden modules may be selected from the same batch of cameras to form the sample set.

For example, a histogram is drawn according to the statistical result of the macro-infinity focus ranges of the same batch of main cameras, and the main cameras corresponding to the middle area of the histogram are selected to form the sample set.

Further, for each binocular camera in the sample set, a focal length of the binocular camera at each of multiple physical distances may be obtained.

For example, a VCM DAC value collection environment may be established first. Specifically, a plane measurement image target may be set, and multiple preset VCM measurement distance is set. Then, an auto focus software is set by configuring a region of interest (ROI), a step size and a starting point.

The preset VCM measurement distance and the physical distance for calibrating may be the same or different from each other.

Then, for each main camera in the sample set, the VCM DAC value of the main camera corresponding to each preset VCM measurement distance is acquired. Specifically, for each preset VCM measurement distance of each main camera, auto focus scanning is started first, and read a stabilized VCM DAC value.

For each preset VCM measurement distance of each main camera, a more accurate VCM DAC value may be obtained by averaging VCM DAC values obtained through multiple measurements.

Further, for each physical distance, the focal lengths of all binocular cameras in the sample set under the physical distance is averaged to obtain the focal length corresponding to the physical distance.

For example, after VCM DAC values of all the main cameras in the sample set at all preset VCM measurement distances are acquired, an average value of all VCM DAC values corresponding to each preset VCM measurement distance is calculated, and the average value may characterize a focal length corresponding to the preset VCM measurement distance.

Alternatively, after measuring the focal lengths of the binocular camera at multiple physical distances, and before averaging the focal lengths of all binocular cameras in the sample set at the physical distance, the focal lengths of the binocular cameras in the sample set at each of the multiple physical distances may be normalized to align the focal lengths of the binocular cameras at each physical distance.

Specifically, due to factors such as the preparation process, even for the binocular cameras of the same batch, the VCM DAC values of different binocular cameras at the Macro focus (or Infinity focus) may be different. Therefore, it is required to align the measurement results of each sample in the sample set.

Furthermore, the VCM DAC value at the Macro focus (or Infinity focus) of a specific binocular camera in the sample set may be used as a reference for alignment.

Further, after aligning the measurement results of all binocular cameras in the sample set, the average value of the measurement results corresponding to each physical distance may be calculated to obtain the VCM DAC value corresponding to each physical distance.

TABLE 1

Normalized Measurement Results

| Num. | Macro focus | 53 cm | 60 cm | 70 cm | 80 cm | 100 cm | 120 cm | 150 cm | Infinity focus |
|---|---|---|---|---|---|---|---|---|---|
| #16 | 560 | 262 | 258 | 249 | 246 | 238 | 232 | 228 | 240 |
| #21 | 560 | 320 | 316 | 309 | 304 | 298 | 293 | 284 | 244 |
| #25 | 560 | 286 | 283 | 276 | 270 | 267 | 259 | 255 | 248 |
| #43 | 560 | 296 | 292 | 284 | 281 | 273 | 265 | 261 | 232 |
| #44 | 560 | 344 | 342 | 334 | 328 | 324 | 319 | 314 | 252 |
| #55 | 560 | 290 | 284 | 279 | 273 | 270 | 264 | 260 | 236 |
| #81 | 560 | 312 | 305 | 300 | 293 | 289 | 282 | 280 | 228 |
| #92 | 560 | 273 | 264 | 257 | 254 | 250 | 242 | 238 | 244 |
| #100 | 560 | 307 | 302 | 294 | 293 | 285 | 282 | 275 | 236 |
| #103 | 560 | 360 | 352 | 344 | 343 | 332 | 324 | 321 | 240 |

For example, referring to Table 1, Table 1 shows VCM DAC values of main cameras with different numbers after being normalized which are measured at the Macro focus, preset VCM measuring distances of 53 cm, 60 cm, 70 cm, 80 cm, 100 cm, 120 cm, 150 cm and the Infinity focus.

For the measurement results of each main camera in the sample set listed in Table 1, all measured VCM DAC values are normalized based on the VCM DAC value of the main camera numbered #16 at the Macro focus. Specifically, the VCM DAC value of each numbered main camera at the Macro focus is aligned to the VCM DAC value of the main camera numbered #16 at the Macro focus. Furthermore, the VCM DAC value at each of the preset VCM measuring distances and Infinity focus of each numbered main camera is proportionally scaled with the same scaling ratio according to which the VCM DAC value of the main camera at Macro focus is aligned to the VCM DAC value of the main camera numbered #16 at Macro focus.

In an embodiment, it can be found through experiments that the relationship between the physical distances and the focal lengths is linear. Therefore, even if the preset VCM measurement distance is different from the physical distance for calibrating, the focal length corresponding to the physical distance for calibrating may be calculated based on the linear relationship.

Further, the focal length in the first focal length group may be calculated based on the linear formula determined by the above linear relationship.

Alternatively, in order to more accurately characterize the relationship between the measured physical distances and the focal lengths, the nonlinear relationship between the physical distances and the focal lengths may be obtained by curve fitting. Therefore, a focal length corresponding to a physical distance for calibrating may be calculated based on the nonlinear relationship.

In an embodiment, the first focus group may be stored in a One Time Programmable (OTP) storage area of an intelligent device integrated with the binocular camera. For example, the first focus group may be stored an OTP storage area of a smart phone equipped with the binocular camera to save the hardware cost of the OTP area of the binocular camera module.

Alternatively, the linear relationship between the focal lengths and the physical distances determined based on S1011 may be converted into a linear relationship expression, and the linear relationship expression may be stored in the OTP storage area of the intelligent device. Accordingly, when S101 is performed, the linear relationship expression is read from the OTP storage area of the intelligent device, and a focal length is calculated according to a corresponding physical distance for calibrating to obtain the first focal length group.

For example, S1011 and S1012 may be performed in different processes, for example, S1011 is performed in an early process of data preparation, and S1012 is performed in a process of calibration operation.

In the process of calibration operation, the Macro focus value and Infinity focus value of the main camera of the currently calibrated binocular camera may be read from the OTP memory area, and a relationship between the physical distances and the focal lengths measured for the binocular cameras belonging to the same batch as the currently calibrated binocular camera is read from the OTP storage area. This example is described by taking the relationship between physical distances and VCM DAC values as an example.

Further, the VCM DAC value corresponding to each physical distance for calibrating is calculated based on the physical distance for calibrating, the VCM DAC value of the currently calibrated binocular camera at the Macro focus, the VCM DAC value of the currently calibrated binocular camera at the Infinity focus, and the relationship between the physical distances and the VCM DAC values.

In addition, when calculating the VCM DAC value corresponding to the physical distance for calibrating, it is also required to normalize the VCM DAC value of the currently calibrated binocular camera at the Macro focus to the VCM DAC value of the binocular camera at the Macro focus that is used as the reference during the measurements, so as to obtain a more accurate calculation result.

In an embodiment, S102 may include traversing the focal lengths in the first focal length group, and performing a calibration operation on the binocular camera based on the focal length acquired each time.

Specifically, for the focal length acquired each time, the binocular camera may be controlled to shoot the calibration target plate to obtain a main image and a sub image, where the main image is shot by the main camera based on the focal length; a relative position of the main image and the sub image are compared to obtain the calibration parameter corresponding to the focal length.

For example, the reading the VCM DAC value may be started from a first VCM DAC value in the first focus group, and the VCM of the main camera in the currently calibrated binocular camera may be set according to the VCM DAC value, so as to drive a lens of the main camera to move to the calibration position.

Further, the photographing module is started to control the main camera to shoot the calibration target plate to obtain a left calibration image (corresponding to the main image) and control the sub camera to shoot the calibration target plate to obtain a right calibration image (corresponding to the sub image). The main camera shoots the left calibration image based on the focal length characterized by the first VCM DAC value. In addition, during the process of calibration operation, the relative position between the binocular camera and the calibration target plate remains unchanged.

Further, the calibration calculation module calculates a relative position between the left calibration image and the right calibration image according to a preset calibration algorithm to generate a calibration parameter. The calibration parameter may include an internal parameter matrix, an external parameter matrix and a distortion parameter.

Further, a mapping lookup relationship is established between the calculated calibration parameter and the first VCM DAC value.

Further, a second VCM DAC value in the first focus group is acquired subsequently, and the above steps is repeated to establish a mapping lookup relationship between the calibration parameter and the second VCM DAC value.

The above steps are performed iteratively until a mapping lookup relationship is established between each of all VCM DAC values in the first focus group and the corresponding calibration parameter.

Therefore, in this embodiment, the focus length is adjusted by changing the position of the VCM in the main camera, so as to perform multiple calibration operations based on different focal lengths while maintaining the constant physical distance between the binocular camera and the calibration target plate.

Alternatively, since the sub camera is a fixed focus camera, the sub image obtained by the sub camera during the calibration operations should be fixed. Accordingly, during multiple calibration operations, the sub camera may be controlled to shoot a calibration target plate only once to save calibration cost.

In an embodiment, the relationship between the calibration parameters and the focal lengths may be stored in an OTP storage area of an intelligent device integrated with the binocular camera.

In an embodiment, the first focus group and the relationship between the calibration parameters and the focus may be stored in the OTP storage area of the intelligent device integrated with the binocular camera.

From the above, in this implementation scheme, multiple calibration parameters are acquired by performing multiple calibration operations on the binocular camera, and different calibration parameters correspond to different focal lengths. Since multiple calibration parameters correspond to different focal lengths, the most appropriate calibration parameter may be selected based on the real-time focal length for shooting to rectify the image shot by the binocular camera, so as to effectively eliminate the row alignment error and parallax error, improving the accuracy of image rectification. Furthermore, during the multiple calibration operations, the calibration parameters at different physical distances are obtained by changing the focal length of the main camera without changing the physical distance between the binocular camera and the calibration target plate. As a result, there is no additional burden during the calibration operations, and the cost of calibration operations is not increased.

Figure 3:
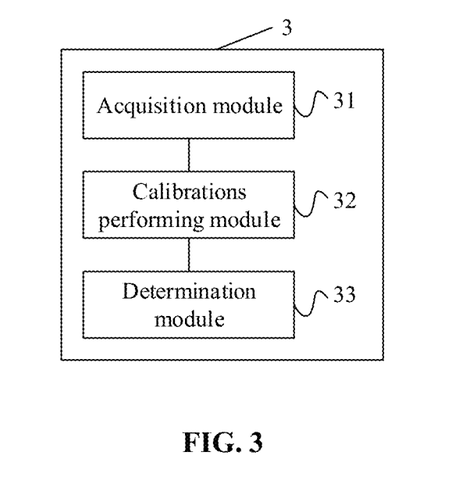
FIG. 3 is a schematic structural diagram of a device for calibrating a binocular camera according to an embodiment of the present disclosure.

FIG. 3 is a schematic structural diagram of a device for calibrating a binocular camera according to an embodiment of the present disclosure. Those skilled in the art understand that the device 3 for calibrating a binocular camera in this embodiment may be used to implement the method as described in the above embodiments of FIG. 1 and FIG. 2.

Specifically, referring to FIG. 3, the device 3 for calibrating a binocular camera in this embodiment may include: an acquisition module 31, a calibration performing module 32, and a determination module 33. The acquisition module 31 is configured to acquire a first focal length group, where the first focal length group includes multiple focal lengths for calibrating, and each of the focal lengths represents a focal length of a main camera in the binocular camera. The calibrations performing module 32 is configured to perform calibration operations on the binocular camera based on the first focal length group, where the focal length of the main camera in the binocular camera for shooting a calibration target plate is adjusted during each of the calibration operations, the adjusted focal length is determined based on the first focal length group, and a relative position between the binocular camera and the calibration target plate remains unchanged during the calibration operations. The determination module 33 is configured to determine a relationship between calibration parameters and the focal lengths based on the calibration operations.

For more description about the operation principle and operation mode of the device 3 for calibrating a binocular camera, reference may be made to the relevant description with reference to FIG. 1 and FIG. 2 above, which will not be repeated here.

In an embodiment, the device 3 for calibrating a binocular camera may be implemented as a chip with calibration function in a calibration device, or a chip with data processing function, such as a System-On-a-Chip (SOC), a baseband chip. Alternatively, the device 3 for calibrating a binocular camera may be implemented as a chip module including a chip with calibration function in a calibration device, or a chip module including a chip with data processing function. Alternatively, the device 3 for calibrating a binocular camera may be implemented as a calibration device.

Figure 4:
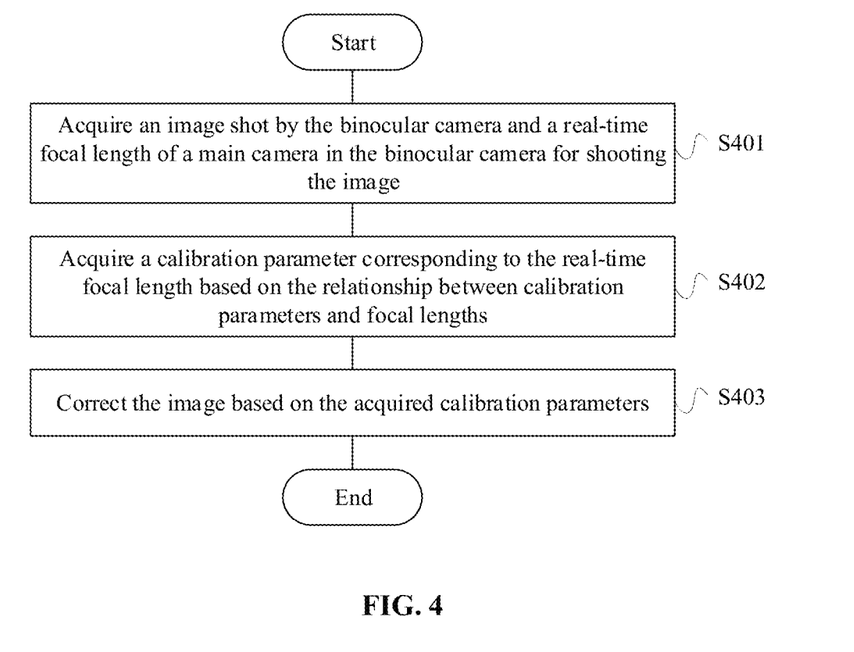
FIG. 4 is a flow chart of an image rectification method for a binocular camera according to an embodiment of the present disclosure.

FIG. 4 is a flow chart of an image rectification method for a binocular camera according to an embodiment of the present disclosure.

This implementation scheme may be applied to a real-time rectification scene when taking images with a binocular camera, such as real-time rectification of row alignment error and parallax error in the binocular image.

This implementation scheme may be implemented by an intelligent device integrated with a binocular camera, such as a smartphone and an IPAD configured with a binocular camera system.

In an embodiment, the image rectification method for a binocular camera in S401 to S403 may be performed by a chip with image rectification function in an intelligent device, or by a baseband chip in an intelligent device.

Specifically, referring to FIG. 4, the image rectification method for a binocular camera in this embodiment may include S401 to S403.

In S401, an image shot by the binocular camera and a real-time focal length of a main camera in the binocular camera for shooting the image are acquired.

In S402, a calibration parameter corresponding to the real-time focal length is acquired based on the relationship between the calibration parameters and the focal lengths.

In S403, the image is rectified based on the acquired calibration parameter.

The relationship between the calibration parameters and the focal lengths may be determined by performing multiple calibration operations with the above calibration method as shown in FIG. 1 and FIG. 2.

For detailed description to terms involved in this embodiment, reference may be made to the relevant description of the embodiments as shown in FIG. 1 and FIG. 2, which will not be repeated here.

More specifically, the image shot by the binocular camera may include a main image and a sub image.

Further, after S403, the image rectification method in this embodiment may further include generating a depth map based on the rectified image, where the depth map is used to represent depth information in the image.

For example, during actual shooting, a preset auto focusing program in the intelligent device is started to perform focusing on the target shot object.

Further, the main camera and the sub camera of the binocular camera are used to respectively obtain the main image and the sub image, and the real-time VCM DAC value when the main camera shoots the main image is read.

Further, based on the real-time VCM DAC value, the mapping lookup table stored in the OTP storage area of the intelligent device is searched to acquire a calibration parameter corresponding to the real-time VCM DAC value. The mapping lookup table records the relationship between the physical distance and the VCM DAC value.

Further, the depth calculation module of the intelligent device acquires the main image and the sub image and performs image rectification based on the stereo rectification algorithm and the preferred calibration parameter to generate a main/sub rectification image with row aligned.

Furthermore, a depth map may be generated based on the rectified image for subsequent processing.

Therefore, the VCM DAC value is set according to the physical distance, and lens of the main camera is driven to change the focal length based on the VCM DAC value. Further, a calibration parameter at the focal length is calculated by using a preset calibration algorithm, and multiple calibration parameters obtained through multiple calibration operations and the corresponding VCM DAC values are automatically saved. In the subsequent shooting, the VCM DAC value of the main camera at that time will be read, and the most appropriate calibration parameter is acquired from the multiple prestored calibration parameters. Then, the optimal main and sub images are generated to avoid row alignment error and parallax error.

Figure 5:
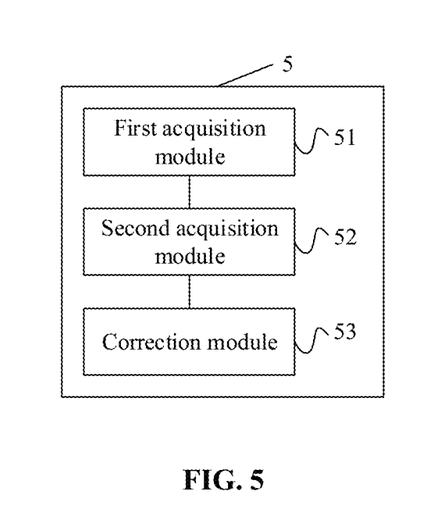
FIG. 5 is a schematic structural diagram of an image rectification device for a binocular camera according to an embodiment of the present disclosure.

FIG. 5 is a schematic structural diagram of an image rectification device for a binocular camera according to an embodiment of the present disclosure. Those skilled in the art understand that the image rectification device 5 for a binocular camera in this embodiment may be used to implement the method described in the above embodiment of FIG. 4.

Specifically, referring to FIG. 4, the image rectification device 5 for a binocular camera in this embodiment may include: a first acquisition module 51, a second acquisition module 52 and a rectification module 53. The first acquisition module 51 is configured to acquire an image shot by a binocular camera and a real-time focus of a main camera of the binocular camera for shooting the image. The second acquisition module 52 is configured to acquire a calibration parameter corresponding to the real-time focal length based on a relationship between calibration parameters and the focal lengths determined by performing the method for calibrating a binocular camera. The rectification module 53 is configured to rectify the image based on the acquired calibration parameter.

For detailed description of the operation principle and operation mode of the image rectification device 5 for a binocular camera, reference may be made to the above relevant description with reference to FIG. 4.

In an embodiment, the image rectification device 5 for a binocular camera may be implemented as a chip with image rectification function in an intelligent device, or a chip with data processing function, such as a System-On-a-Chip (SOC), a baseband chip. Alternatively, the image rectification device 5 for a binocular camera may be implemented as a chip module including a chip with an image rectification function in an intelligent device, or a chip module including a chip with a data processing function. Alternatively, the image rectification device 5 for a binocular camera may be implemented as an intelligent device.

In an embodiment, each module/unit included in each device and product described in the above embodiments may be a software module/unit, or a hardware module/unit, or part of a software module/unit and part of a hardware module/unit.

For example, for each device and product applied to or integrated in the chip, each module/unit contained therein may be implemented in the way of hardware such as circuit, or at least some modules/units may be implemented in the way of software program, the software program runs on the processor integrated inside the chip, and the remaining (if any) parts of modules/units may be implemented in the way of hardware such as circuit; for each device and product applied to or integrated in the chip module, each module/unit contained therein may be implemented in the way of hardware such as circuit, and different modules/units may be located in the same component (such as chip, circuit module, etc.) or different components of the chip module, or at least some modules/units may be implemented in the way of software program, the software program runs on the processor integrated in the chip module, and the rest (if any) of the modules/units may be implemented in hardware such as circuit; for each device and product applied to or integrated in the terminal, each module/unit contained therein may be implemented in the way of hardware such as circuit, different modules/units may be located in the same component (such as chip, circuit module, etc.) or different components in the terminal, or at least some modules/units may be implemented in the way of software program, which runs on the processor integrated in the terminal, the remaining (if any) modules/units may be realized by hardware such as circuit.

Further, a storage medium is provided according to an embodiment of the present disclosure, on which a computer program is stored, and the computer program, when run by the processor, performs the method described in the embodiments shown in FIG. 1 and FIG. 2 or FIG. 4. Preferably, the storage medium may include a computer-readable storage medium such as a non-volatile memory or a non-transitory memory. The storage medium may include ROM, RAM, disk, or optical disc, etc.

Further, a terminal is provided according to an embodiment of the present disclosure, which includes a memory and a processor. The memory stores a computer program that is capable of running on the processor. The processor, when running the computer program, performs the method described in the embodiments shown in FIG. 1, FIG. 2, or FIG. 4. Alternatively, the terminal may include the above device 3 for calibrating a binocular camera shown in FIG. 3.

Further, an intelligent device is provided according to an embodiment of the present disclosure, which includes a memory and a processor. The memory stores a computer program that is capable of running on the processor. The processor, when running the computer program, performs the above method described in the embodiments shown in FIG. 4. Specifically, the smart device may be a smart phone, an IPAD, etc. Furthermore, the intelligent device is integrated with the binocular camera. Alternatively, the intelligent device may include the above image rectification device 5 for a binocular camera shown in FIG. 5.

Although the present disclosure is described as above, the present disclosure is not limited thereto. Any person skilled in the art may make various changes and modifications without departing from the spirit and scope of the present disclosure. Therefore, the protection scope of the present disclosure shall be defined to the scope defined in the claims.

In addition, the present disclosure is described as follows.

The technical problem to be solved by the present disclosure is to provide an improved method for calibrating a binocular camera to improve the accuracy of image rectification.

To solve the above technical problem, a method for calibrating a binocular camera is provided according to an embodiment of the present disclosure, which includes: acquiring a first focus group, where the first focus group includes multiple focal lengths for calibrating, and each of the focal lengths represents a focal length of a main camera in the binocular camera; performing calibration operations on the binocular camera based on the first focal length group, where the focal length of the main camera in the binocular camera for shooting a calibration target plate is adjusted during each of the calibration operations, the adjusted focal length is determined based on the first focal length group, and a relative position between the binocular camera and the calibration target plate remains unchanged during the calibration operations; and determining a relationship between calibration parameters and the focal lengths based on the multiple calibration operations.

In an embodiment, the acquiring a first focal length group includes: acquiring a relationship between physical distances and focal lengths; and selecting, based on the relationship between physical distances and focal lengths, multiple focal lengths related to physical distances for calibrating, to obtain the first focal length group.

In an embodiment, the acquiring a relationship between physical distances and focal lengths includes acquiring a sample set, where the sample set includes multiple binocular cameras; and measuring a focal length of each of the binocular cameras in the sample set at each of the physical distances to obtain the relationship between physical distances and focal lengths.

In an embodiment, the sample set is selected from the same batch of binocular cameras based on a statistical result of macro-infinity focus range, where each of the macro-infinity focus ranges refers to a difference between a Macro focus and an Infinity focus of a binocular camera.

In an embodiment, the measuring a focal length of each of the binocular cameras in the sample set at each of the physical distances, to obtain the relationship between physical distances and focal lengths includes: measuring a focal length of each of the binocular cameras in the sample set at each of the physical distances; and averaging, for each of the physical distances, focal lengths of the binocular cameras in the sample set, to obtain a focal length corresponding to the physical distance.

In an embodiment, after the measuring a focal length of each of the binocular cameras in the sample set at each of the physical distances, and before the averaging, for each of the physical distances, focal lengths of the binocular cameras in the sample set, the measuring a focal length of each of the binocular cameras in the sample set at each of the physical distances, to obtain the relationship between physical distances and focal lengths further includes: normalizing the focal length of each of the binocular cameras in the sample set at each of the physical distances, to align the focal lengths of the binocular cameras at each of the physical distances In an embodiment, the relationship between physical distances and focal lengths is linear or nonlinear.

In an embodiment, the performing calibration operations on the binocular camera based on the first focus group includes: traversing the multiple focal lengths in the first focal length group and calibrating the binocular camera based on a focal length acquired each time.

In an embodiment, the calibrating the binocular camera based on the focal length acquired each time includes controlling, for the focal length acquired each time, the binocular camera to shoot the calibration target plate to obtain a main image and a sub image, where the main image is shot by the main camera based on the focal length; and comparing a relative position between the main image and the sub image to acquire a calibration parameter corresponding to the focal length.

In an embodiment, the first focus group and/or the relationship between calibration parameters and the focus lengths are stored in an OTP storage area of an intelligent device integrated with the binocular camera.

In an embodiment, the focal length is characterized by a VCM DAC value, where the VCM DAC value represents a current value of a current flowing through a coil in a voice coil motor during the voice coil motor driving the main camera to move to adjust the focal length.

To solve the above technical problem, an image rectification method for a binocular camera is further provided according to an embodiment of the present disclosure, which includes: acquiring an image shot by the binocular camera and a real-time focal length of a main camera in the binocular camera for shooting the image; acquiring a calibration parameter corresponding to the real-time focal length based on the relationship between calibration parameters and the focal lengths determined by using the above method for calibrating a binocular camera; and rectifying the image based on the acquired calibration parameter.

In an embodiment, the image rectification method further includes generating a depth map based on the rectified image, where the depth map is used to represent depth information in the image.

To solve the above technical problem, a device for calibrating a binocular camera is further provided according to an embodiment of the present disclosure, which includes: an acquisition module, a calibrations performing module and a determination module. The acquisition module is configured to acquire a first focal length group, where the first focal length group includes multiple focal lengths for calibrating, and each of the focal lengths represents a focal length of a main camera in the binocular camera. The calibrations performing module is configured to perform calibration operations on the binocular camera based on the first focal length group, where the focal length of the main camera in the binocular camera for shooting a calibration target plate is adjusted during each of the calibration operations, the adjusted focal length is determined based on the first focal length group, and a relative position between the binocular camera and the calibration target plate remains unchanged during the calibration operations. The determination module is configured to determine a relationship between calibration parameters and the focal lengths based on the calibration operations.

To solve the above technical problem, an image rectification device for a binocular camera is further provided according to an embodiment of the present disclosure, which includes: a first acquisition module, a second acquisition module and a rectification module. The first acquisition module is configured to acquire an image shot by the binocular camera and a real-time focal length of a main camera in the binocular camera for shooting the image. The second acquisition module is configured to acquire a calibration parameter corresponding to the real-time focal length based on the relationship between calibration parameters and the focal lengths determined by using the method for calibrating a binocular camera. The rectification module is configured to rectify the image based on the acquired calibration parameter.

To solve the above technical problem, a storage medium is further provided according to an embodiment of the present disclosure, on which a computer program is stored, the computer program, when executed by a processor, performs the above described methods.

To solve the above technical problem, a terminal is further provided according to an embodiment of the present disclosure, which includes the above device for calibrating a binocular camera, or includes a processor and a memory, where the memory stores a computer program capable of running on the processor, and the processor, when running the computer program, performs steps of the above method.

To solve the above technical problem, an intelligent device is further provided according to an embodiment of the present disclosure, which includes the above image rectification device for a binocular camera, or includes a memory and a processor, where the memory stores a computer program capable of running on the processor, and the processor, when running the computer program, performs steps of the above image rectification method.

In an embodiment, the intelligent device also includes the binocular camera.

Compared with the schemes described in the background section, the technical solution of the embodiment of the present disclosure has the following beneficial effects.

A method for calibrating a binocular camera is provided according to an embodiment of the present disclosure, which includes: acquiring a first focus group, where the first focus group includes multiple focal lengths for calibrating, and each of the focal lengths represents a focal length of a main camera in the binocular camera; performing calibration operations on the binocular camera based on the first focal length group, where the focal length of the main camera in the binocular camera for shooting a calibration target plate is adjusted during each of the calibration operations, the adjusted focal length is determined based on the first focal length group, and a relative position between the binocular camera and the calibration target plate remains unchanged during the calibration operations; and determining a relationship between calibration parameters and the focal lengths based on the multiple calibration operations.

Compared with the technical scheme in which calibration operation is performed only once to obtain a single calibration parameter, in this implementation scheme, multiple calibration parameters are acquired by performing multiple calibration operations on the binocular camera, and different calibration parameters correspond to different focal lengths. The relationship between the calibration parameters and the focal lengths may be obtained, which can be used to select the most appropriate calibration parameter based on an actual focal length in actual shooting. In particular, since multiple calibration parameters correspond to different focal lengths, the most appropriate calibration parameter may be selected based on the real-time focal length for shooting to rectify the image shot by the binocular camera, so as to effectively eliminate the row alignment error and parallax error, improving the accuracy of image rectification. Furthermore, during the multiple calibration operations, the calibration parameters at different physical distances are obtained by changing the focal length of the main camera without changing the physical distance between the binocular camera and the calibration target plate. As a result, there is no additional burden during the calibration operations, and the cost of calibration operations is not increased.

Further, the focal length is characterized by the VCM DAC value, where the VCM DAC value represents a current value of a current flowing through a coil in the voice coil motor during the voice coil motor drives the main camera to move to adjust the focal length. In this implementation scheme, the focal length of the main camera is quantized and characterized by the VCM DAC value, without additional components dedicated to read the focal length. Therefore, in this implementation scheme, the focus length may be adjusted by changing the position of the VCM in the main camera, so that calibration operation can be performed for multiple times at different focal lengths while maintaining the constant physical distance between the binocular camera and the calibration target plate.

Further, an image rectification method for a binocular camera is further provided according to an embodiment of the present disclosure, which includes: acquiring an image shot by the binocular camera and a real-time focal length of a main camera in the binocular camera for shooting the image; acquiring a calibration parameter corresponding to the real-time focal length based on the relationship between calibration parameters and the focal lengths determined by using the above method for calibrating a binocular camera; and rectifying the image based on the acquired calibration parameter.

Therefore, the VCM DAC value is set according to a specific physical distance, and the lens of the main camera is driven to change the focal length based on the VCM DAC value. Further, a calibration parameter corresponding to the focal length is calculated by using a preset calibration algorithm, and multiple calibration parameters obtained by performing multiple calibration operations and the corresponding VCM DAC values are automatically saved. In subsequent shooting, the VCM DAC value of the main camera at that time will be read, and the most appropriate calibration parameter is acquired from the prestored calibration parameters. Then, optimal main/sub rectification image is generated, to avoid the row alignment error and parallax error.

The invention claimed is:

1. A method for calibrating a binocular camera, comprising:
   acquiring a first focal length group, wherein the first focal length group comprises a plurality of focal lengths for calibrating, and each of the focal lengths represents a focal length of a main camera in the binocular camera;
   performing calibration operations on the binocular camera based on the first focal length group, wherein the focal length of the main camera in the binocular camera for shooting a calibration target plate is adjusted during each of the calibration operations, the adjusted focal length is determined based on the first focal length group, and a relative position between the binocular camera and the calibration target plate remains unchanged during the calibration operations; and
   determining a relationship between calibration parameters and the focal lengths based on the calibration operations;
   wherein the acquiring a first focal length group comprises:
      acquiring a relationship between physical distances and focal lengths; and
      selecting, based on the relationship between physical distances and focal lengths, a plurality of focal lengths related to physical distances for calibrating, to obtain the first focal length group;
   wherein the acquiring a relationship between physical distances and focal lengths comprises:
      acquiring a sample set, wherein the sample set comprises a plurality of binocular cameras; and
      measuring a focal length of each of the binocular cameras in the sample set at each of the physical distances, to obtain the relationship between physical distances and focal lengths.

2. The method according to claim 1, wherein the sample set is selected from the same batch of binocular cameras based on a statistical result of macro-infinity focus ranges, wherein each of the macro-infinity focus ranges refers to a difference between a Macro focus and an Infinity focus of a binocular camera.

3. The method according to claim 1, wherein the measuring a focal length of each of the binocular cameras in the sample set at each of the physical distances, to obtain the relationship between physical distances and focal lengths comprises:
   measuring a focal length of each of the binocular cameras in the sample set at each of the physical distances; and
   averaging, for each of the physical distances, focal lengths of the binocular cameras in the sample set, to obtain a focal length corresponding to the physical distance.

4. The method according to claim 3, wherein after the measuring a focal length of each of the binocular cameras in the sample set at each of the physical distances, and before the averaging, for each of the physical distances, focal lengths of the binocular cameras in the sample set, the measuring a focal length of each of the binocular cameras in the sample set at each of the physical distances, to obtain the relationship between physical distances and focal lengths further comprises:
   normalizing the focal length of each of the binocular cameras in the sample set at each of the physical distances, to align the focal lengths of the binocular cameras at each of the physical distances.

5. The method according to claim 1, wherein the performing calibration operations on the binocular camera based on the first-focus focal length group comprises:
   traversing the plurality of focal lengths in the first focal length group and calibrating the binocular camera based on a focal length acquired each time.

6. The method according to claim 5, wherein the calibrating the binocular camera based on the focal length acquired each time comprises:
   controlling, for the focal length acquired each time, the binocular camera to shoot the calibration target plate to obtain a main image and a sub image, wherein the main image is shot by the main camera based on the focal length; and
   comparing a relative position between the main image and the sub image to acquire a calibration parameter corresponding to the focal length.

7. The method according to claim 1, wherein the first focal length group and/or the relationship between calibration parameters and the focal lengths are stored in an OTP storage area of an intelligent device integrated with the binocular camera.

8. The method according to claim 1, wherein the focal length is characterized by a VCM DAC value, wherein the VCM DAC value represents a current value of a current flowing through a coil in a voice coil motor during the voice coil motor drives the main camera to move to adjust the focal length.

9. A non-transitory computer readable storage medium, comprising a computer program stored thereon, wherein the computer program, when executed by a processor, causes the processor to:
   acquire a first focal length group, wherein the first focal length group comprises a plurality of focal lengths for calibrating, and each of the focal lengths represents a focal length of a main camera in the binocular camera;

perform calibration operations on the binocular camera based on the first focal length group, wherein the focal length of the main camera in the binocular camera for shooting a calibration target plate is adjusted during each of the calibration operations, the adjusted focal length is determined based on the first focal length group, and a relative position between the binocular camera and the calibration target plate remains unchanged during the calibration operations; and determine a relationship between calibration parameters and the focal lengths based on the calibration operations;

wherein the processor is further caused to:
 acquire a relationship between physical distances and focal lengths; and
 select, based on the relationship between physical distances and focal lengths, a plurality of focal lengths related to physical distances for calibrating, to obtain the first focal length group;

wherein the processor is further caused to:
 acquire a sample set, wherein the sample set comprises a plurality of binocular cameras; and
 measure a focal length of each of the binocular cameras in the sample set at each of the physical distances, to obtain the relationship between physical distances and focal lengths.

10. A terminal, comprising:
a memory storing computer instructions; and
a processor configured to execute the computer instructions for:

acquiring a first focal length group, wherein the first focal length group comprises a plurality of focal lengths for calibrating, and each of the focal lengths represents a focal length of a main camera in the binocular camera;

performing calibration operations on the binocular camera based on the first focal length group, wherein the focal length of the main camera in the binocular camera for shooting a calibration target plate is adjusted during each of the calibration operations, the adjusted focal length is determined based on the first focal length group, and a relative position between the binocular camera and the calibration target plate remains unchanged during the calibration operations; and determining a relationship between calibration parameters and the focal lengths based on the calibration operations;

wherein the acquiring the first focal length group comprises:
 acquiring a relationship between physical distances and focal lengths; and
 selecting, based on the relationship between physical distances and focal lengths, a plurality of focal lengths related to physical distances for calibrating, to obtain the first focal length group;

wherein the acquiring the relationship between physical distances and focal lengths comprises:
 acquiring a sample set, wherein the sample set comprises a plurality of binocular cameras; and
 measuring a focal length of each of the binocular cameras in the sample set at each of the physical distances, to obtain the relationship between physical distances and focal lengths.

11. The terminal according to claim 10, wherein the sample set is selected from the same batch of binocular cameras based on a statistical result of macro-infinity focus ranges, wherein each of the macro-infinity focus ranges refers to a difference between a Macro focus and an Infinity focus of a binocular camera.

12. The terminal according to claim 10, wherein the measuring a focal length of each of the binocular cameras in the sample set at each of the physical distances, to obtain the relationship between physical distances and focal lengths comprises:
 measuring a focal length of each of the binocular cameras in the sample set at each of the physical distances; and
 averaging, for each of the physical distances, focal lengths of the binocular cameras in the sample set, to obtain a focal length corresponding to the physical distance.

13. The terminal according to claim 12, wherein after the measuring a focal length of each of the binocular cameras in the sample set at each of the physical distances, and before the averaging, for each of the physical distances, focal lengths of the binocular cameras in the sample set, the measuring a focal length of each of the binocular cameras in the sample set at each of the physical distances, to obtain the relationship between physical distances and focal lengths further comprises:
 normalizing the focal length of each of the binocular cameras in the sample set at each of the physical distances, to align the focal lengths of the binocular cameras at each of the physical distances.

14. The terminal according to claim 10, wherein the performing calibration operations on the binocular camera based on the first focal length group comprises:
 traversing the plurality of focal lengths in the first focal length group and calibrating the binocular camera based on a focal length acquired each time.

15. The terminal according to claim 14, wherein the calibrating the binocular camera based on the focal length acquired each time comprises:
 controlling, for the focal length acquired each time, the binocular camera to shoot the calibration target plate to obtain a main image and a sub image, wherein the main image is shot by the main camera based on the focal length; and
 comparing a relative position between the main image and the sub image to acquire a calibration parameter corresponding to the focal length.

16. The terminal according to claim 10, wherein the first focal length group and/or the relationship between calibration parameters and the focal lengths are stored in an OTP storage area of an intelligent device integrated with the binocular camera.

* * * * *